United States Patent [19]

Shimmell

[11] Patent Number: 5,494,131
[45] Date of Patent: Feb. 27, 1996

[54] METHOD AND APPARATUS FOR DAMPING VIBRATIONS IN AN AUTOMOTIVE VEHICLE HAVING A CONVERTIBLE ROOF

[75] Inventor: Roger A. Shimmell, Plymouth, Mich.

[73] Assignee: Ford Motor Company, Dearborn, Mich.

[21] Appl. No.: 270,540

[22] Filed: Jul. 5, 1994

[51] Int. Cl.⁶ ........................................ B60K 1/00
[52] U.S. Cl. ............................. 180/300; 248/567
[58] Field of Search ................... 180/300, 89.1, 180/207; 267/139, 140; 280/784, 777, 689; 73/622; 248/562, 564–567; 293/110, 122, 129, 131, 132, 134–138, 102, 104, 107, 109; 296/203, 204, 189, 194, 186

[56] References Cited

U.S. PATENT DOCUMENTS

| | | | |
|---|---|---|---|
| 2,756,952 | 7/1956 | Gazley | 248/567 |
| 3,545,737 | 12/1970 | Lamprey | 267/141 |
| 3,794,310 | 2/1974 | Mewhinney | 267/139 |
| 4,027,739 | 6/1977 | Allenthorp | 180/89.1 |
| 4,358,152 | 11/1982 | Mayer | 180/89.1 |
| 4,491,304 | 1/1985 | Kakimoto et al. | 267/140.1 |
| 4,509,781 | 4/1985 | Dick | 267/140 |
| 4,538,697 | 9/1985 | Muroi et al. | 180/68.4 |
| 4,562,589 | 12/1985 | Warnaka et al. | 381/71 |
| 4,693,491 | 9/1987 | Akatsu et al. | 280/688 |
| 4,929,008 | 5/1990 | Esfandiary | 267/139 |
| 4,951,930 | 8/1990 | Uno et al. | 267/293 |
| 5,042,872 | 8/1991 | Yoshii | 296/194 |

OTHER PUBLICATIONS

SAE Technical Paper Series, Lateral Shake Analysis of Open Top Cars, Akihiro Yamauchi, Makoto Nagano, and Tadashi Kimura, 920409.
Vehicle N.V.H. (Noise, Vibration and Harshness) R. W. Alexander, pp. 1–12.
Mercedes—Benz Shop Manual Model 124.066 (300 CE Cabriolet) 1992, pp. 60–65.

Primary Examiner—Robert J. Oberleitner
Assistant Examiner—C. T. Bartz
Attorney, Agent, or Firm—Gregory P. Brown; Roger L. May

[57] ABSTRACT

An convertible automotive vehicle having a unibody chassis with a single mass damper for reducing perceptible passenger compartment vibrations is disclosed. The single mass damper is uniquely tuned to the overall vehicle frequency response and suspended between a rail adjacent to a front suspension assembly and a bumper mounted to the rail with an energy absorbing device.

6 Claims, 3 Drawing Sheets

METHOD AND APPARATUS FOR DAMPING VIBRATIONS IN AN AUTOMOTIVE VEHICLE HAVING A CONVERTIBLE ROOF

BACKGROUND OF THE INVENTION

1. Field of the Invention

This invention relates to mass dampers for reducing undesirable vibration in automobiles having a unibody chassis. More particularly, the present invention provides a single mass damper capable of significantly reducing torsional vehicle vibration of the unibody chassis having a convertible roof.

2. Disclosure Information

It is well known in the automotive noise, vibration and harshness art to use mass dampers to reduce vibration of specific components attached to an automotive vehicle chassis. Generally, a mass damper is attached directly to the structure as near as possible to the specific component for which vibration reduction is desired. By resiliently mounting a predetermined mass directly to the identified vibrating structure and tuning the mass damper to the vibrating frequency of the specific component, the undesired vibration can be significantly reduced. However this approach is limited where there is insufficient package space to physically attach a mass damper adjacent to the specific component. Furthermore, this approach may require multiple mass dampers to reduce vibrations of more than one vibrating component.

As an alternative solution, a mass damper may be physically attached to or adjacent to a source of excitation, such as an internal combustion engine, having a predetermined idle speed and a corresponding frequency of vibration. A mass damper may be tuned to match the engine idle speed frequency and attached to or near the internal combustion engine. This approach reduces the vibration energy transferred to the vibrating structure, thereby reducing the overall vibration of the structure and the associated components. Following this approach, several mass dampers, may be required to reduce the vibrations caused by multiple excitation sources.

It would be desirable to have a single mass damper capable of absorbing vibration energy from a variety of excitation sources that is effective at reducing the vibration of the vibrating structure and specific components.

SUMMARY OF THE INVENTION

The present invention provides a unique mass damper for use in an automotive vehicle having a unibody chassis and convertible roof. The mass damper reduces vibrations within the passenger compartment thereby improving customer satisfaction.

In the presently preferred embodiment, the automotive vehicle further includes a front end and a passenger compartment and right and left pillars disposed therebetween. A header extends transversely between the pillars, and right and left rails extend forward from the pillars and terminate at right and left forward ends. There are right and left energy absorbers supported on the forward ends of the rails and having a bumper attached thereto. The bumper includes one end that extends beyond the right energy absorber. The chassis has a chassis characteristic frequency.

The automotive vehicle further includes a powertrain assembly resiliently suspended from the unibody chassis. The powertrain assembly has a powertrain characteristic frequency.

The automotive vehicle further includes left and right suspension assemblies connected to the unibody chassis that resiliently support the chassis on the road wheels. The suspension assembly has a suspension characteristic frequency.

The automotive vehicle further includes a mass damper having a first end suspended from the right rail, adjacent to the right suspension assembly, and a second end suspended from the bumper. The mass damper has a resonant frequency tuned to reduce perceptible torsional vehicle vibrations within the passenger compartment excited by vibrations of the unibody chassis at the chassis characteristic frequency, the powertrain at the powertrain characteristic frequency, and the suspension at the suspension characteristic frequency. The bumper is adapted to move rearward when impacted and the mass damper is adapted to rotate downward so as not to impede rearward movement of the bumper.

Other objects, features and advantages of the present invention will become apparent to those skilled in the art from the drawings, detailed description and claims which follow.

DESCRIPTION OF THE PREFERRED EMBODIMENT

Figure 1:
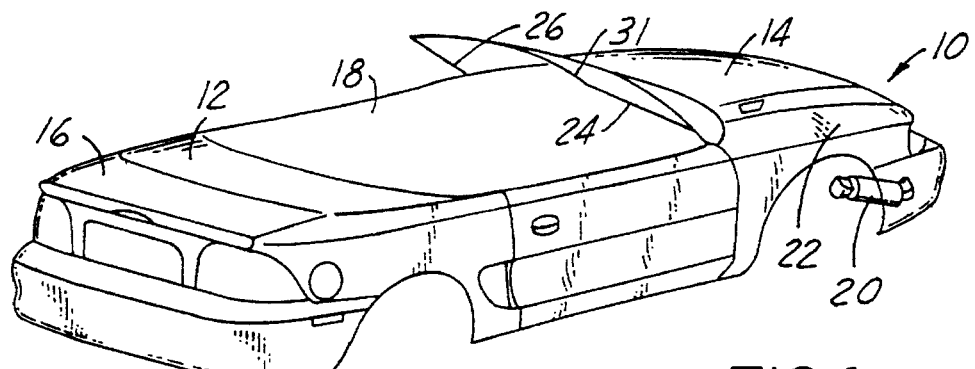
FIG. 1 is a rear three quarter view of an automotive vehicle illustrating a mass damper located in the front end of the vehicle according to the present invention.
Figure 2:
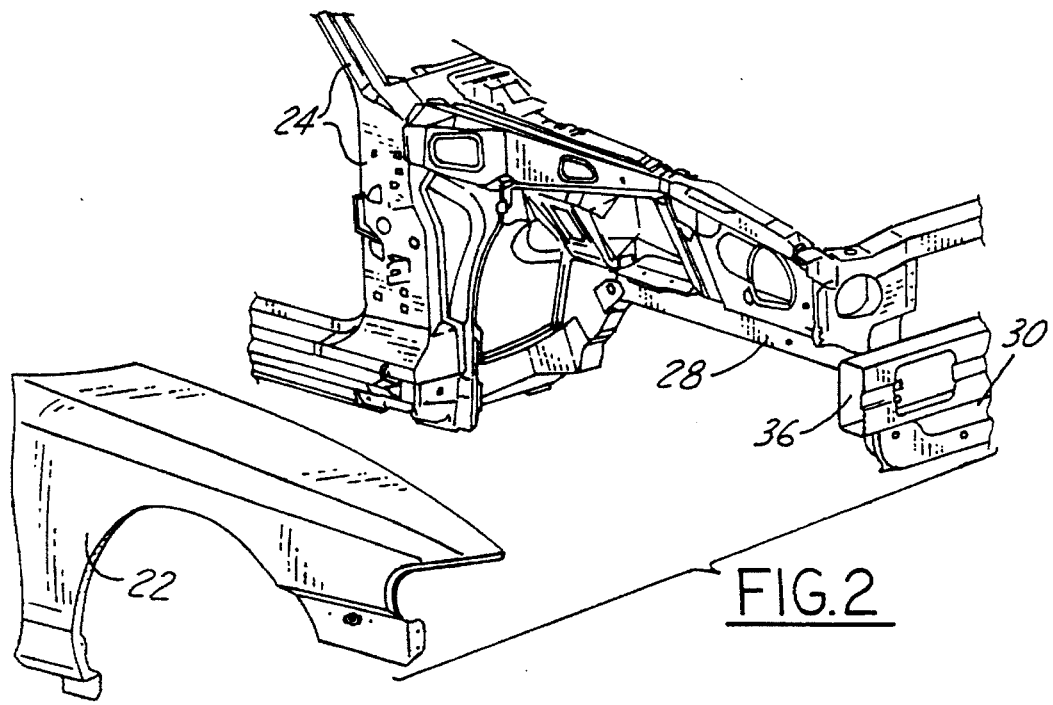
FIG. 2 is an exploded view of a front end of an automotive vehicle illustrating a fender and unibody chassis according to the present invention.

Referring now to FIG. 1, a unibody chassis 10 for an automotive vehicle is shown. The unibody chassis 10 has a convertible roof 12, (illustrated in its retracted position), a front end 14, a rear end 16 and passenger compartment 18 disposed therebetween. A mass damper 20 is shown in the presently preferred location covered by a front fender 22. FIG. 2 illustrates the right hand side of the front end 14 of the unibody chassis 10 with the right front fender 22 removed. It should be recognized that the left hand side of the unibody chassis 10 is simply the symmetric opposite of the right hand side, and is therefore not shown.

As further illustrated in FIGS. 1 and 2, the chassis 10 includes right and left pillars 24, 26 disposed between the front end 14 and the passenger compartment 18. Disposed between the top ends of the right and left pillars 24, 26 is a header 31. A windshield 33 is disposed within the header 31 and the upper portions of the right and left pillars 24, 26 and includes a rear view mirror (not shown) mounted thereon.

Figure 3:
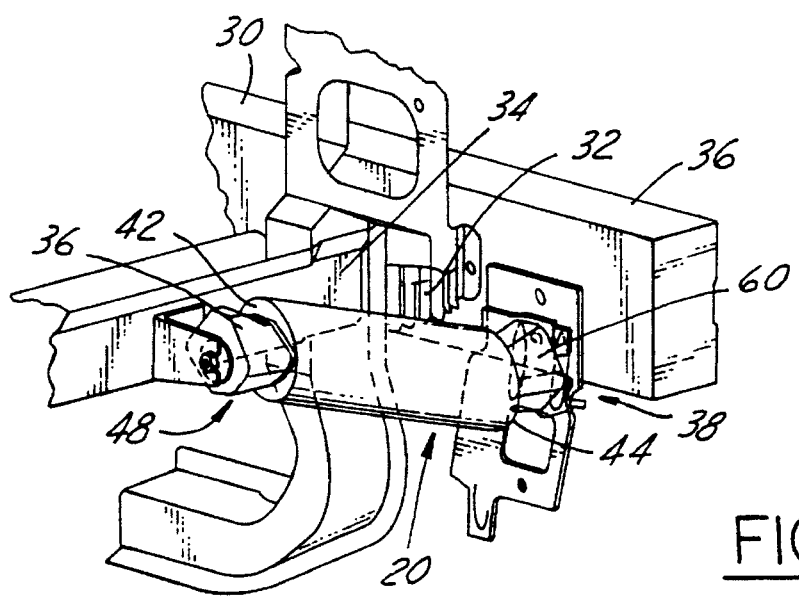
FIG. 3 is a perspective view illustrating an installed mass damper according to the present invention.

Referring to FIGS. 2 and 3, the unibody chassis 10 also includes a right rail 28 extending forward from the right pillar 24 to an energy absorbing device 32. A bumper 30 extends transversely and is supported on the energy absorbing device 32. The bumper 30 supports a front facia (not shown). In the event a load rearwardly directed is applied on the facia and the bumper 30 that exceeds a predetermined minimum, the energy absorber device 32 will deform to absorb the load, whereby the bumper 30 moves rearwardly with respect to the rail 28. One end 36 of the bumper 30 extends several inches beyond the point of attachment of the energy absorbing device 32.

Figure 4:
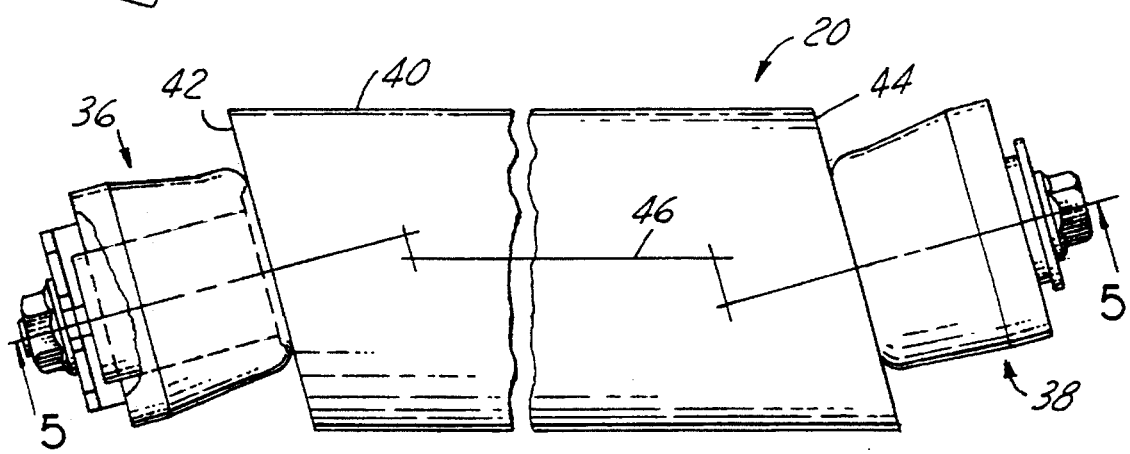
FIG. 4 is an elevational view illustrating a mass damper according to the present invention.
Figure 5:
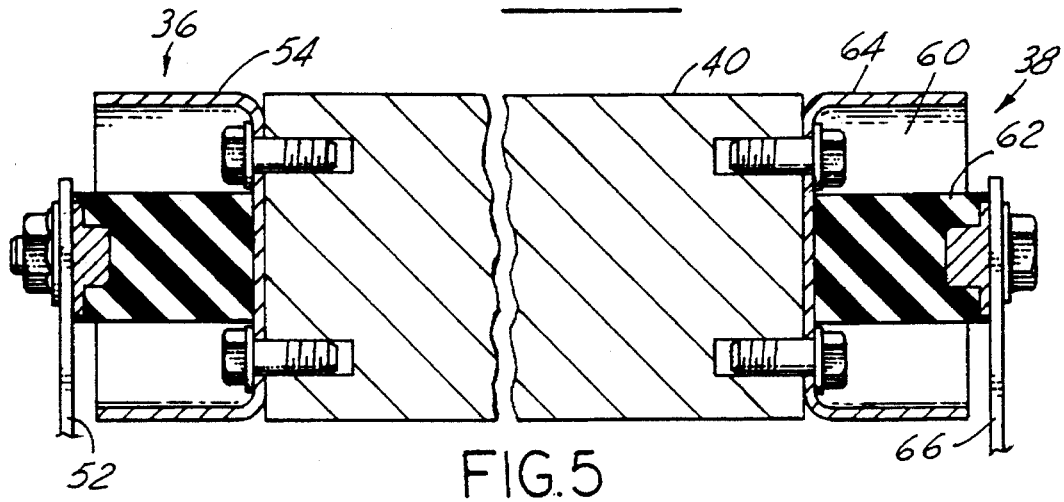
FIG. 5 is a sectional view taken from FIG. 4 illustrating a mass damper according to the present invention.

Referring to FIGS. 3, 4 and 5, the mass damper 20 will now be described in detail. The mass damper 20 includes a first end 36 and an elongate cylindrical member 40 extending forwardly to a second end 38 adjacent to the bumper 30. The elongate cylindrical member 40 in the presently preferred embodiment is manufactured from cast iron to provide the lowest cost for a given mass quantity. Alternative materials are contemplated where packaging constraints dictate denser materials, such as lead. The elongate cylindrical member 40 includes a first face 42 opposite from a second face 44 and a longitudinal axis 46 extending therebetween.

The first end 36 of the mass damper 20 includes a first resilient mount 48 permitting relative movement between the elongate cylindrical member 40 and the right rail 28. The first resilient mount 48 includes a first elastomeric body 50 secured between a first plate 52 and a second plate 54. The first plate 52 attaches to the right rail 28, and the second plate 54 attaches to the first face 42. In the presently preferred embodiment conventional threaded fasteners provide attachment, however, the present invention is not so limited. Clearly other known removable fasteners, such as rivets are contemplated.

The second end 38 of the mass damper 20 includes a second resilient mount 60 permitting relative movement between the elongate cylindrical member 40 and the bumper 30. The second resilient mount 60 includes a second elastomeric body 62 secured between a third plate 64 and a fourth plate 66. The third plate 64 attaches to the second face 44 and the fourth plate 66 attaches to one end 36 of the bumper 30. The second resilient mount 60 attaches at a point lower in the vehicle than does the first resilient mount 48, such that the longitudinal axis of the elongate cylindrical member 40 is not parallel to the longitudinal axis of the rail 28. This tilts the elongate member 40 downward so the first face 42 is higher in the vehicle than the second face 44. This orientation permits the mass damper to rotate downward, allowing unimpeded rearward movement of the bumper 30. In the presently preferred embodiment conventional threaded fasteners attach the resilient mount 60 to both the bumper 30 and the elongate cylindrical member 40, however, the present invention is not so limited. Clearly other known removable fasteners, such as rivets, are contemplated. Together, the first and second resilient mounts 48, 60 permit relatively free vertical vibration of the elongate cylindrical member 40.

The following empirical method of selecting the resilience of the resilient mounts 48, 60 and the mass of the elongate cylindrical member 40 significantly improves the efficiency of the mass damper as compared to a mass damper that is tuned according to traditional methods. A mass damper tuned according to this method is superior for reducing perceivable vibrations within the passenger compartment. Additionally, by tuning the mass damper to the complete vehicle response in accordance with the present invention surprisingly improves the vibration characteristics of the multiple individual components.

Figure 6:
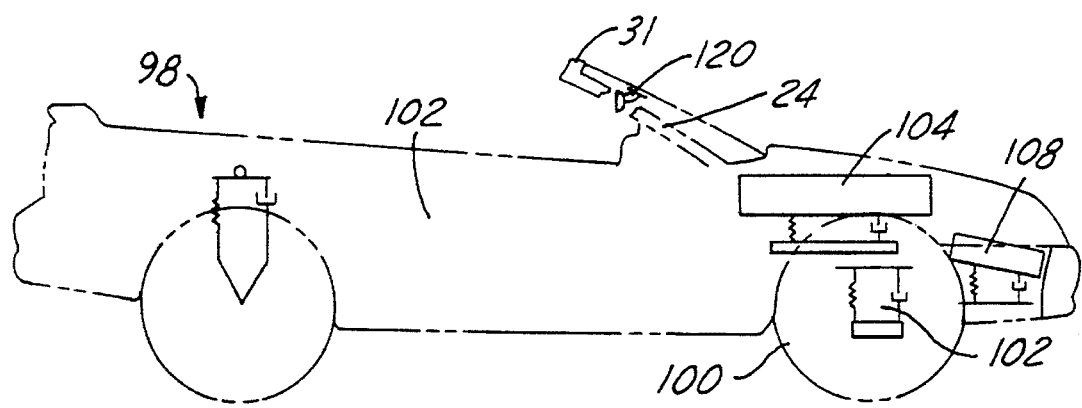
FIG. 6 is an elevational view illustrating the mechanical relationships of several subsystems of an automotive vehicle according to the present invention.
Figure 7:
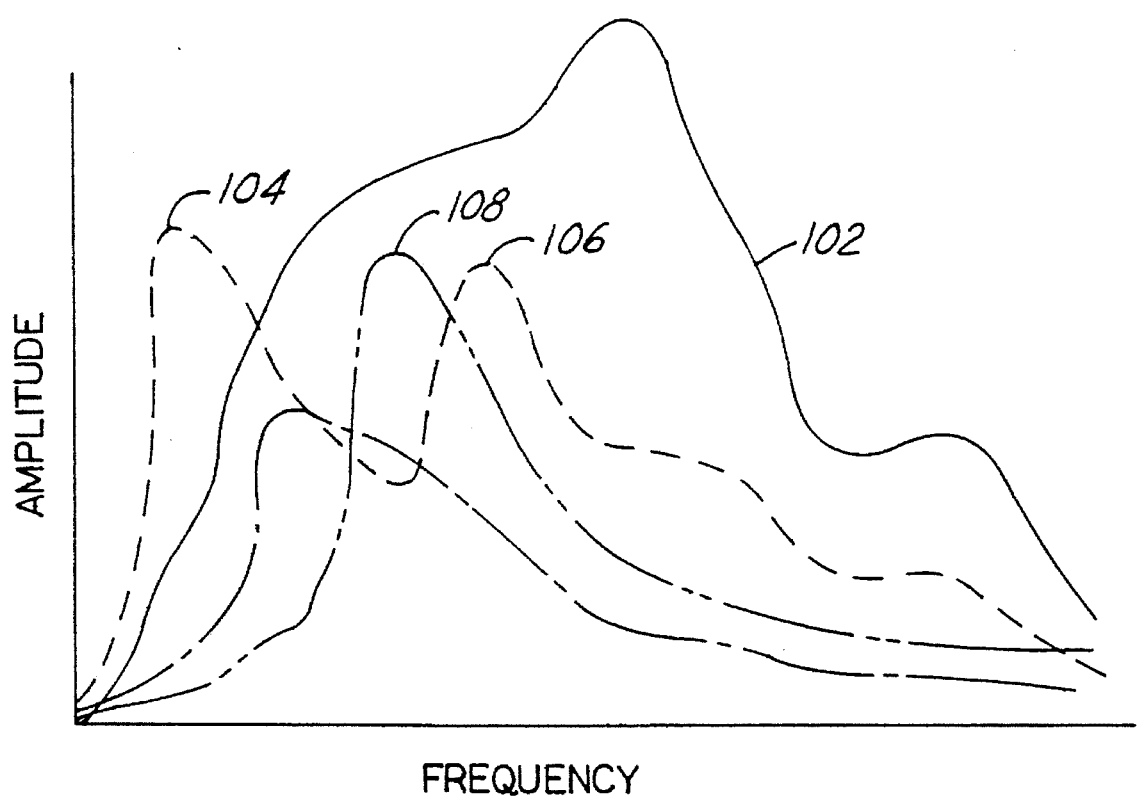
FIG. 7 is a graphical representation of characteristic frequency responses for several subsystems within an automotive vehicle according to the present invention.

Referring to FIGS. 6 and 7, tuning the mass damper 40 to the complete vehicle response first requires that a fully equipped and road ready vehicle 98 be placed on a hydraulic road simulator (not shown), or the equivalent thereof. The road simulator, commonly known to those skilled in the automotive chassis art area, must be capable of imparting displacement upon a pair of road wheels 100 of the automotive vehicle 98 at a predetermined amplitude, phase and frequency. In the presently preferred embodiment for reducing vibrations at the header 31 and the rear view mirror 120, the road simulator forces the front wheels 100 into vertical displacements of approximately 0.5 inches, with one side being about 180 degrees out of phase with the opposite side. This road simulator is capable of varying the input frequency from 0–40 hertz. In most automotive vehicles this input readily excites the torsional mode of vibration of the vehicle.

The vehicle must also be instrumented for measuring acceleration data at various components of the automotive vehicle. Using conventional acceleration transducers, the measured data may be plotted as shown in FIG. 7. For instance, this frequency response data may be taken for a suspension assembly 102 by installing an accelerometer on a wheel lip of a rim. Similarly, data for a powertrain assembly 104 may be acquired by installing an accelerometer on or near an outboard edge of an engine component, so as to accurately acquire the torsional displacements of the powertrain. Measuring data on a unibody chassis 106 may be accomplished by mounting an accelerometer at the intersection of the header 31 and the right pillar 24.

By referring to this frequency response plot, the "characteristic" frequency for the given component may be determined by reading the frequency corresponding to the peak amplitude for a given component. Significantly, the characteristic frequency, as herein defined, is different than the fundamental vibration frequency for that same component. The fundamental frequency would represent the resonant frequency for that component and its resilient mounts mounted to a rigid test fixture. Here, the characteristic frequency takes into account the difference between being mounted to a rigid test fixture and actually being mounted within the automotive vehicle. For example, as shown in FIG. 7, the characteristic frequency of the unibody chassis is shown by the chassis response 106, while the same chassis, tested without components installed, is shown by fundamental chassis frequency 108. As can be seen, there is an interaction among the components making up the complete vehicle system, which leads to unique vibration characteristics for the individual components when installed in the vehicle.

Once the characteristic frequencies for the suspension system 102, the powertrain 104, and the chassis 106 have been determined from the plot, the mass damper is tuned to an initial frequency that lies substantially midway between the chassis characteristic frequency 106 and the suspension system characteristic frequency 102. A typical chassis characteristic frequency lies in the range of 10–16 hertz, a typical powertrain characteristic frequency lies in the range of 8–12 hertz and a typical suspension characteristic frequency lies in the range of 15–19 hertz. From this example, it can be seen that an initial frequency for the mass damper resonant frequency should be approximately 14 hertz.

A mass damper tuned to the initial frequency is then installed at various locations on the unibody chassis 10 and the total vehicle is excited by the road simulator and new graphs are generated to determine the effect of various locations. A location for the mass damper 20 will be found through this iterative process that reduces vibration of the specific component, such as the rear view mirror 120. The final step then involves selecting the most efficient resonant frequency for the mass damper 20. A variety of mass dampers having a range of resonant frequencies may be tested, plotting new frequency plots for each. This data is evaluated to determine which mass damper provides the greatest reduction in vibrations of the header 31, while simultaneously reducing the amplitude of the vibrations of the suspension assembly 102 without increasing the amplitude of vibration of the powertrain 104. In the presently preferred embodiment, the resonant frequency of the mass damper 20 is about 14 hertz, the chassis characteristic frequency is about 12 hertz, the suspension characteristic frequency is about 17 hertz and the Engine characteristic frequency is about 10 hertz.

Various other modifications and permutations of the present invention, no doubt, will occur to those skilled in the art. Therefore, it is the following claims, including all equivalents, which define the scope of the present invention.

What is claimed is:

1. An automotive vehicle having a convertible roof, said automotive vehicle comprising:

a unibody chassis including a front end a passenger compartment and right and left pillars disposed therebetween, a header extending transversely between said pillars, right and left rails extending forward from said pillars and terminating at right and left forward ends having right and left energy absorbers disposed thereon and a bumper attached thereto, said bumper having one end extending beyond said right energy absorber, said chassis having a chassis characteristic frequency;

a powertrain assembly resiliently suspended from said unibody chassis and having a powertrain characteristic frequency;

a suspension assembly resiliently suspended from unibody chassis and having a suspension characteristic frequency;

said energy absorbers being constructed to deform when a rearwardly directed load that exceeds a predetermined minimum is imposed on said bumper, whereby said bumper moves rearwardly relative to said right and left rails; and a mass damper being supported on one of said rails and said one end of said bumper by resilient mounts, whereby said damper will not substantially impede the rearward movement of said bumper when subjected to said rearwardly directed load.

2. An automotive vehicle having a convertible roof, said automotive vehicle comprising:

a unibody chassis including a front end and a passenger compartment and right and left pillars disposed therebetween, a header extending transversely between said pillars, right and left rails extending forward from said pillars and terminating at right and left forward ends having right and left energy absorbers disposed thereon and a bumper attached thereto, said bumper having one end extending beyond said right energy absorber, said chassis having a chassis characteristic frequency;

a powertrain assembly resiliently suspended from said unibody chassis and having a powertrain characteristic frequency;

a suspension assembly resiliently suspended from unibody chassis and having a suspension characteristic frequency; and a mass damper having a first end suspended from said right rail, adjacent to said suspension assembly, and a second end suspended from said bumper, said mass damper having a resonant frequency tuned to reduce perceptible vibrations within the passenger compartment excited by vibrations of said unibody chassis at said chassis characteristic frequency, said powertrain assembly at said powertrain characteristic frequency, and said suspension assembly at said suspension characteristic frequency.

3. An automotive vehicle according to claim 2, wherein said mass damper apparatus further comprises:

an elongate member extending from a first face to a second face;

a first resilient mount interconnecting said first face to said first rail; and a second resilient mount interconnecting said second face to said bumper at a point lower than said first resilient mount whereby said elongate member rotates downward upon rearward motion of said bumper.

4. An automotive vehicle according to claim 2, whereby said bumper is adapted to move rearward when impacted and said mass damper is adapted to rotate downward so as not to substantially impede rearward movement of said bumper.

5. An automotive vehicle having a convertible roof, said automotive vehicle comprising:

a unibody chassis including a front end and a passenger compartment and right and left pillars disposed therebetween, a header extending transversely between said pillars, right and left rails extending forward from said pillars and terminating at right and left forward ends having right and left energy absorbers disposed thereon and a bumper attached thereto, said bumper having one end extending beyond said right energy absorber, said chassis having a chassis characteristic frequency;

a powertrain assembly resiliently suspended from said unibody chassis and having a powertrain characteristic frequency;

a suspension assembly resiliently suspended from unibody chassis and having a suspension characteristic frequency; and a mass damper comprising:

an elongate member extending from a first face to a second face;

a first resilient mount interconnecting said first face to said first rail, adjacent to said suspension assembly; and a second resilient mount interconnecting said second face to said bumper at a point lower than said first resilient mount whereby said elongate member rotates downward upon rearward motion of said bumper;

said mass damper having a resonant frequency tuned to reduce perceptible vibrations within the passenger compartment excited by vibrations of said unibody chassis at said chassis characteristic frequency, said powertrain assembly at said powertrain characteristic frequency, and said suspension assembly at said suspension characteristic frequency.

6. An automotive vehicle according to claim 5, whereby said bumper is adapted to move rearward when impacted and said mass damper is adapted to rotate downward so as not to substantially impede rearward movement of said bumper.

* * * * *